US008911701B2

(12) United States Patent
Gaillard et al.

(10) Patent No.: US 8,911,701 B2
(45) Date of Patent: Dec. 16, 2014

(54) PROCESS FOR FABRICATING CARBON NANOTUBES AND APPARATUS FOR IMPLEMENTING THE PROCESS

(75) Inventors: Patrice Gaillard, Hagetaubin (FR); Serge Bordere, Jurancon (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/424,784

(22) Filed: Mar. 20, 2012

(65) Prior Publication Data

US 2012/0251433 A1 Oct. 4, 2012

Related U.S. Application Data

(60) Provisional application No. 61/466,222, filed on Mar. 22, 2011.

(30) Foreign Application Priority Data

Mar. 21, 2011 (FR) ...................... 11 52289

(51) Int. Cl.
*C07B 31/00* (2006.01)
*C01B 31/02* (2006.01)
*B82Y 30/00* (2011.01)
*B82Y 40/00* (2011.01)

(52) U.S. Cl.
CPC .............. *C01B 31/024* (2013.01); *B82Y 30/00* (2013.01); *B82Y 40/00* (2013.01); *Y10S 977/843* (2013.01)
USPC ....................... 423/447.1; 423/447.3; 977/843

(58) Field of Classification Search
USPC ............. 423/447.1, 447.3; 422/129; 977/842, 977/843
See application file for complete search history.

(56) References Cited

U.S. PATENT DOCUMENTS

| 5,500,200 | A | 3/1996 | Mandeville et al. |
| 7,468,097 | B2 * | 12/2008 | Henley et al. ................... 95/139 |
| 2004/0151654 | A1 * | 8/2004 | Wei et al. ................... 423/447.3 |
| 2009/0008610 | A1 * | 1/2009 | Bordere et al. ............... 252/511 |
| 2009/0169465 | A1 * | 7/2009 | Jang et al. ................. 423/445 B |

FOREIGN PATENT DOCUMENTS

| EP | 1 391 425 A1 | 2/2004 |
| EP | 1 980 530 A1 | 10/2008 |
| KR | 2009-0073341 A | 7/2009 |
| WO | WO 03/002456 A2 | 1/2003 |

OTHER PUBLICATIONS

Yu Hao et al, "Agglomerated CNTs Synthesized in a Fluididized Bed Reactor: Agglomerate Structure and Formation Mechanism," *Carbon*, 41 (2003), pp. 2855-2863, 2003 Elsevier Ltd.

* cited by examiner

*Primary Examiner* — Richard M Rump
(74) *Attorney, Agent, or Firm* — Buchanan Ingersoll & Rooney P.C.

(57) ABSTRACT

An industrial process and an apparatus for fabricating carbon nanotubes (CNTs) is provided, comprising synthesis of the carbon nanotubes by decomposing a carbon source brought into contact, in a fluidized-bed reactor, whereby the carbon nanotubes synthesized in the reactor and fixed onto the grains of catalytic substrate in the form of an entangled three-dimensional network, forming agglomerates constituting the CNT powder, are recovered sequentially by discharging them while hot, that is to say at the reaction temperature for synthesizing the CNTs, at the foot of the reactor, the sequence in which the discharges are carried out corresponding to the frequency of filling of the reactor.

18 Claims, 6 Drawing Sheets

PROCESS FOR FABRICATING CARBON NANOTUBES AND APPARATUS FOR IMPLEMENTING THE PROCESS

The invention relates to an industrial process for fabricating carbon nanotubes. It also relates to an apparatus for implementing the process.

More precisely, one subject of the invention is an industrial process for fabricating carbon nanotubes that consists, on the one hand, in producing the carbon nanotubes by synthesizing them by means of a CVD (chemical vapour deposition) technique employing a fluidized catalyst bed and, on the other hand, in recovering the carbon nanotubes produced.

PRIOR ART

Carbon nanotubes are recognized today as being materials of great advantage owing to their mechanical properties, their very high aspect of (length/diameter) ratios and their electrical properties.

Specifically, it will be recalled that carbon nanotubes (hereafter called CNTs) possess particular crystalline structures, of tubular form, the tubes being hollow and closed, made up of atoms uniformly arranged in the form of pentagons, hexagons and/or heptagons, obtained from carbon. In general, CNTs consist of one or more wound graphite sheets. A distinction is thus made between single-walled nanotubes or SWNTs and multi-walled nanotubes or MWNTs.

It will also be recalled that carbon nanotubes usually have a mean diameter ranging from 0.1 to 200 nm, preferably from 0.1 to 100 nm, more preferably from 0.4 to 50 nm and better still from 1 to 30 nm and advantageously a length of more than 0.1 µm and advantageously from 0.1 to 20 µm, for example about 6 µm. Thus, their length/diameter ratio is advantageously greater than 10 and usually greater than 100.

CNT production may be carried out by various processes, however, of interest here is the CVD (chemical vapour deposition) synthesis process and in particular the phase of recovering the CNTs produced in the synthesis reactor.

In general, CNT synthesis processes using the CVD technique consist in bringing a carbon source into contact, at a temperature between 500 and 1500° C., with a catalyst, generally in the form of metal-coated substrate grains, acting as a fluidized bed. The CNTs synthesized are fixed onto the catalytic substrate grains in the form of an entangled three-dimensional network, forming agglomerates with a mean size $d_{50}$ greater than around one hundred microns, typically around 300 to 600 microns. The parameter $d_{50}$ represents the apparent diameter of 50% of the population of the agglomerates. The CNTs thus obtained may be used as such in most applications, but it is also possible to subject them to a subsequent additional purification step designed to separate the CNTs from the grains of the catalytic substrate and/or also to reduce the size of the CNT agglomerates.

The preferential metals used for the catalyst that may be mentioned are iron Fe, cobalt Co, nickel Ni and molybdenum Mo, and the substrates supporting the catalytic metal include alumina, silica, magnesia or carbon.

The gaseous carbon sources generally used are methane, ethane, butane, propane, ethylene, acetylene, benzene, methanol, ethanol, etc., either separately or as a mixture.

The carbon nanotubes produced in the reactor are recovered. Two techniques known at the present time may be used to do so.

The first technique consists in carrying out a batch fabrication and recovery process, also called a discontinuous fabrication and recovery process. The discontinuous nature relates to the fact that the operation of the reactor is stopped until it has cooled down. In fact the reactor is stopped, after fabrication of each batch, and then cooled, after which the aggregates produced are extracted from the reactor so as to recover the CNTs obtained.

The reader may refer for further details to patent application WO 03/002456 and to the simplified diagram shown in FIG. 1 illustrating this technique. The technique described consists in placing a defined mass MC of a catalytic powder of granular composition coming from a tank 50 onto a distributor 11 placed in a fluidizing column of a reactor 40. The fluidizing column is sealingly connected in the top portion of the reactor to a recovery trap 13 designed to collect any fine particles of the catalytic granular composition or a mixture of catalytic granular composition and nanotubes. When the reactor 40 reaches the temperature for synthesizing the carbon nanotubes from the reactive gases 60, the growth of the carbon nanotubes commences and lasts for a predefined time. At the end of growth, the heating, the carbon source and the hydrogen are stopped and the temperature is brought back down to room temperature by slow cooling.

The powder of nanotube agglomerates is extracted from the reactor by suction via the line 14 and stored.

As mentioned above, the fabrication and recovery as a discontinuous or batch process require the reactor to be completely stopped and a waiting time while it cools down.

The second technique consists, unlike the first one, of a continuous fabrication and recovery process, the reactor not being stopped. The recovery is continuous and takes place via an overflow at the top of the reactor.

The reader may refer for more details to the prior art formed by the patent application published under number EP 1 980 530 and to the simplified diagram shown in FIG. 2 that illustrates this technique. The pulverulent catalyst 50 is injected pulsingly, with continuous injection of the reactive gases 60 (carbon source and hydrogen) into the bottom of the reactor 40 and recovery of the CNTs produced by continuous overflow from the top of the reactor 40. The CNTs fixed to the catalyst grains forming agglomerates, i.e. the CNT powder, are recovered by overflow into a container 70 for cooling and inerting the CNT powder, by means of a nitrogen stream 73 so as to purge the CNT powder of the combustible gas residues. This operation serves for recovering the raw CNTs. Next, the CNTs are packaged in transport containers 90.

The reader may also refer to the prior art formed by U.S. Pat. No. 5,500,200. This relates to a CNT synthesis process in which the CNTs are recovered continuously. However, that document neither suggests nor describes the practical solution for carrying out this recovery continuously. In addition, the examples described in said patent relate to a large number of trials which, in all cases, correspond to the formation of batches and show that the operations carried out correspond to a batch synthesis with the reactor being systematically cooled.

The Applicant has found that the two aforementioned CNT recovery techniques have drawbacks in both cases. In the first case, the batchwise draining of the reactor requires a cooling time that lowers the productivity of an industrial installation. In the second case, the recovery via an overflow does not make it possible to recover the coarsest agglomerates that concentrate on the distributor and impair the correct fluidization of the bed necessary for working under industrial production conditions. The Applicant has sought to solve the CNT recovery problem without having the drawbacks of the aforementioned techniques.

The following documents are also known from the prior art:

document EP 1 391 425 which describes a mass production system for continuously producing carbon nanotubes CNTs. The production is continuous when the catalyst and the reactive gases are introduced continuously and when the CNTs are continuously removed from the reactor. According to that technique, recovery takes place via a lateral bottom outlet 5 of the reactor, said outlet being placed above the reactive-gas distributor 2 and connected to a degassing unit 9;

document US 2009/0169465 which also describes a mass production system for continuously producing carbon nanotubes. As in the previous document, the CNTs are recovered via a bottom lateral outlet 122 of the reactor by means of a unit 700 that uses a negative-pressure generator 720, a recovery container 710 with cooling 740, keeping the CNTs at about 400° C., or below this temperature. The layout of the system shows that the lateral outlet 122 for recovering the synthesized products is located above the reactive-gas dispersion grid 126. The dispersion grid 126 corresponds to the gas distributor described in the above document. The CNTs are recovered by opening a valve placed on the CNT outlet line, when the synthesis is complete. A device for detecting the residual gases serves for detecting the level of these gases. The end of a synthesis is determined by this device for detecting the level of residual gases whenever the level reaches a predetermined value;

document KR 2009 0073341 which describes a unit for recovering carbon nanotubes from a reactor. The unit comprises a tank (container) 710 and a tank (container) 750 for storing the CNTs coming from the recovery unit. This document repeats the principle of collecting the CNTs described and diagrammatically shown in document US 2009/0169465. The CNTs are recovered via a bottom lateral outlet of the reactor by means of a unit 700 which uses a negative-pressure generator 720 and a recovery container 710 with cooling 740. The CNTs come from the line 711 connected above the reactive-gas distributor (plate 126); and the publication Carbon 41 (2003) 2855-2863, Yu Hao et al. "Agglomerated CNTs synthesized in a fluidized bed reactor" which describes an experimental system for synthesizing carbon nanotubes in a fluidized bed. The experimental device comprises a reactor provided with a lateral outlet for recovering the CNTs in the lower part of the reactor. This is an experimental system used to study the agglomeration process, whereby the CNTs grow. The publication relates to the study of the change in the CNT agglomerates during the decomposition of propylene on an $Fe/Mo/Al_2O_3$ catalyst in a 196 mm fluidized-bed reactor. This document only describes the synthesis phase starting from a predefined, quantity 4 of catalyst particles until growth of the CNTs is complete. The operating method of recovering the CNTs produced is neither described nor mentioned. In all cases, the experimental set-up shows that the outlet for the synthesized products is located above the reactive-gas distributor and not at the foot of the reactor.

The Applicant has found, surprisingly, an industrial solution that allows the CNTs to be fabricated by synthesizing them using the CVD technique in a reactor, with the CNTs produced being recovered without this recovery operation impairing the productivity of the industrial installation, as is the case with the above-mentioned techniques.

The proposed solution consists in sequentially draining the reactor while hot, by recovering the agglomerates from the bottom of the reactor. Thus, the term "draining" is understood to mean the discharge at the foot of the reactor, i.e. beneath the reactor, of said agglomerates comprising the CNTs, hereafter called CNT powder. The sequential character relates to the frequency of draining of the reactor. This draining takes place at the frequency of filling of the reactor. The catalyst injection is then stopped, while the injection of the reactive gases may be permanently maintained, that is to say without being stopped. In an embodiment variant, provision may be made for the reactive-gas injection to be maintained only for a predetermined time, and then stopped, without thereby stopping the heating of the reactor or a fortiori waiting until it has cooled down in order to discharge the CNT powder (the agglomerates comprising the CNTs).

Thus, in the present invention, the CNTs are recovered by discharging them while hot, that is to say via the bottom of the reactor and not via a lateral outlet located above the gas distributor, as in the cited prior art.

The reactor is considered to be full when the height of the fluidized-bed level inside the reactor reaches a predetermined level, called the reactor fill level. To determine the height of the fluidized-bed level, the filling of the reactor is controlled for example by a multipoint probe 10 placed inside the reactor, the various measurement points M1 . . . M10 being located at various heights and making it possible to determine the change in the level of the fluidized bed in the reactor until the desired fill level is reached, the higher point M10 or a lower point. The measurement is for example a temperature measurement.

Draining at the foot of the reactor is effective since the agglomerates fall by gravity (under the effect of their own weight) and may thus be easily recovered without having to stop heating the reactor and without having to wait until it has cooled down. The period of contact between the catalytic grains and the reactor gases is optimized, unlike in continuous extraction. Continuous extraction necessarily entails agglomerates for which the reactions at all the catalytic sites are not entirely completed.

None of the documents of the prior art suggests recovering the CNTs via the bottom of the reactor, by means of a bottom outlet of the reactor, that is to say beneath said reactor. However, by discharging via the bottom of the reactor, by means of a bottom outlet of the reactor, that is to say beneath said reactor, it is possible to discharge all of the CNT powder including the coarse agglomerates.

In contrast, in the documents of the prior art and in particular in the document US 2009/0169465 considered as the closest prior art, the CNTs are recovered via a lateral outlet of the reactor and does not allow all of the CNTs to be recovered. The accumulated volume beneath the said recovery outlet cannot be recovered. To improve the recovery and clean the walls of the reactor, that document describes a reactor equipped with a pivoting system (162, 166). Such a system makes the operation and the construction of the reactor more complex. Furthermore, the principle of recovering via a lateral outlet discriminates the recovery according to the size of the agglomerates. The coarsest agglomerates may thus be difficult to recover.

More particularly, the Applicant proposes a CNT fabrication process by synthesizing them using the fluidized-bed CVD technique in which the CNT powder is recovered sequentially while hot. During a synthesis phase, the catalyst is pulsingly introduced into the reactor while the carbon source is continuously introduced. Before the CNT recovery phase, the introduction of a catalyst is stopped while the introduction of the reactive gases is continued for a defined time.

The CNT powder is then discharged while hot at the foot of the reactor and introduced into a cooling container.

There is no loss of operating time, the phase of recovering the CNTs produced being compatible with industrialization of the CNT fabrication. The proposed solution makes it possible to optimize the fabrication time and the fabrication volumes, and consequently the productivity of the industrial carbon nanotube fabrication installation. Furthermore, the apparatus for implementing the process does not require a system for cleaning the internal walls of the reactor vessel, as in document US 2009/0169465.

SUMMARY OF THE INVENTION

More precisely, the subject of the invention is an industrial process for fabricating carbon nanotubes (CNTs), comprising synthesis of the carbon nanotubes by decomposing a carbon source brought into contact, in a fluidized-bed reactor at a reaction temperature between 500° C. and 1500° C. with a catalyst in the form of substrate grains covered with a metal, the nanotubes produced being recovered, in which the carbon nanotubes synthesized in the reactor and fixed onto the grains of catalytic substrate in the form of an entangled three-dimensional network, forming agglomerates constituting the CNT powder, are recovered sequentially by discharging them while hot, that is to say at the reaction temperature for synthesizing the CNTs, mainly characterized in that the sequence in which the CNTs are discharged corresponds to the frequency of filling the reactor, and discharge taking place via the bottom of the reactor by means of a bottom outlet of the reactor, that is to say beneath said reactor.

Advantageously, the CNTs are discharged via the bottom outlet of the reactor, said outlet corresponding to an outlet for draining the reactor, said outlet being provided with a valve-type shutoff system, opened sequentially, the outlet of this system being connected to a cooling/storage container capable of holding the CNT powder.

The process is carried out by the following steps:

1) the temperature of the reactor is raised to the value desired for the synthesis, between 500° C. and 1500° C., preferably between 600° C. and 900° C., for example 700° C. for an initialization phase and this temperature is maintained, preferably with a carbon nanotube powder feedstock in the reactor;

2) a CNT synthesis phase for a defined time $T_1$, consisting in:
   pulsingly injecting the catalyst into the reactor by means of an inert gas and
   continuously injecting reactive gases containing the carbon source into the reactor and 3) a hot CNT recovery phase for a time $T_2$, consisting in:
   stopping the injection of the catalyst,
   continuing to inject the reactive gases containing, or the carbon source stopping the injection after having maintained it for a defined time $t_r$,
   discharging the CNT powder at the foot of the reactor in order to introduce it into a cooling container,
   stopping the discharge and
   recommencing a new phase 2).

Advantageously, the process is implemented with a low pressure in the reactor, namely a pressure corresponding to atmospheric pressure.

The carbon nanotubes (CNTs) are recovered sequentially by discharge by means of an outlet at the bottom of the reactor, said outlet being provided with a valve closure system that can be opened sequentially. The outlet of this system is connected to a cooling and storage container capable of receiving the CNT powder.

The catalyst consists of a catalytic metal, chosen from iron, cobalt, nickel and molybdenum, supported by a chemically inert solid substrate in granular form, chosen from alumina, silica, magnesia and carbon.

The catalyst is in the form of a powder and advantageously comprises at least one catalytic metal, such as for example iron, supported by an inert solid substrate, preferably an inorganic substrate and preferably a porous substrate such as gamma-alumina or theta-alumina. This pulverulent catalyst may in particular be fabricated by impregnating the solid substrate with an aqueous solution of said catalytic metal, preferably with mechanical stirring and for example at a temperature of 100° C. to 150° C. followed by calcination of the solid substrate thus impregnated, in particular at a temperature of 200° C. to 400° C. The median diameter $d_{50}$ of the catalyst grains is between 50 microns and 400 microns.

The gaseous carbon source used may be chosen from methane, ethane, propane, butane, ethylene, acetylene, benzene, methanol and ethanol, either separately or as a mixture. This carbon source may be of renewable origin, as described in patent application EP 1 980 530, in particular ethylene obtained by dehydration of an alcohol such as ethanol originating from the fermentation of vegetable matter.

The carbon source is advantageously mixed with a stream of a reducing agent in the gaseous state, for example with a stream of hydrogen or ammonia, preferably with a stream of hydrogen. The carbon source/hydrogen ratio is between 90/10 and 60/40, preferably between 70/30 and 80/20. Advantageously, the CNTs are synthesized with an ethylene/hydrogen mixture in an 80/20 ratio.

The CNTs in the container are cooled using an inert gas, such as nitrogen.

The other subject of the invention is an apparatus for implementing the process comprising a fluidized-bed reactor having a draining outlet for discharging the CNTs at the bottom of the reactor, i.e. beneath the reactor, and a valve closure system for recovering the CNTs, which system is placed on the discharge outlet of the reactor and is capable of recovering the CNT powder, sequentially, at the synthesis reaction temperature.

Advantageously, the closure system is formed by a CNT recovery valve chosen from mechanical valves and more particularly from mechanical valves adapted for the temperature conditions or from nonmechanical valves such as L-valves or J-valves adapted to the temperature conditions. Preferably, the valve is chosen so as to be able to operate at least at the temperature of the CNT powder at the outlet of the reactor. The L-valves or J-valves consist of an L-tube or J-tube. With this type of valve, the longest portion of the tube is connected via its end to the draining outlet of the reactor. Thus, the tube fills with powder and serves as a plug. The tubes forming this type of valve are provided, in the angled portion of the L or J, with inlets so as to allow inert gas to be injected. Thus, to drain the reactor the inert gas is injected and this entrains the powder therewith. L-valves or J-valves are particularly suitable for pneumatically transporting installations.

Advantageously, the reactor comprises:
   a distributor retaining the powder bed and allowing the incoming gases to diffuse so as to obtain a fluidized bed;
   an inlet for the catalyst in the central lateral portion of the vessel;

an inlet for the carbon source in the bottom portion of the vessel;
a means for detecting the filling of the vessel; and
an outlet for recovering the carbon nanotubes obtained by synthesis in said reactor, which outlet is placed at the foot of the reactor at the vessel bottom, connected directly to an orifice of the distributor enabling the powder to pass through it, and the apparatus further includes:
a catalyst buffer tank connected to the catalyst inlet of the reactor vessel via a first valve;
a reserve of the carbon source or an installation for producing the carbon source, connected to the carbon source inlet via a second valve;
a cooling container connected to the recovery valve in order for the carbon nanotubes synthesized in the reactor in powder form to be sequentially collected; and
a CNT discharge line between the draining outlet of the reactor for discharging the CNTs and the cooling container, on which line the recovery valve is placed.

Other features and advantages of the invention will become clearly apparent on reading the following description, which is given by way of non-limiting illustrative example and in conjunction with the figures in which.

Identical elements bear the same references.

Figure 1:
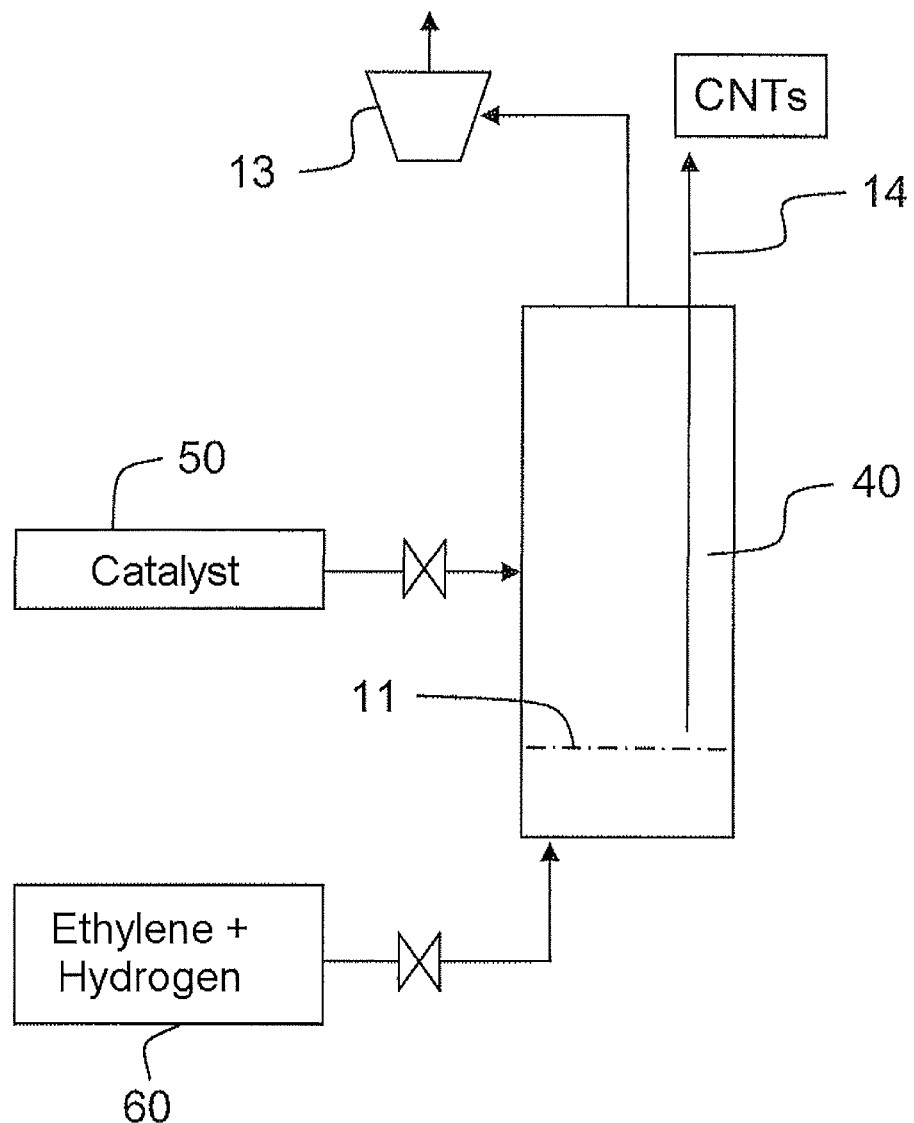
FIG. 1 shows the diagram of an apparatus for fabricating carbon nanotubes by means of a reactor for synthesizing and recovering the CNTs produced in the reactor according to a first technique of the prior art.
Figure 2:
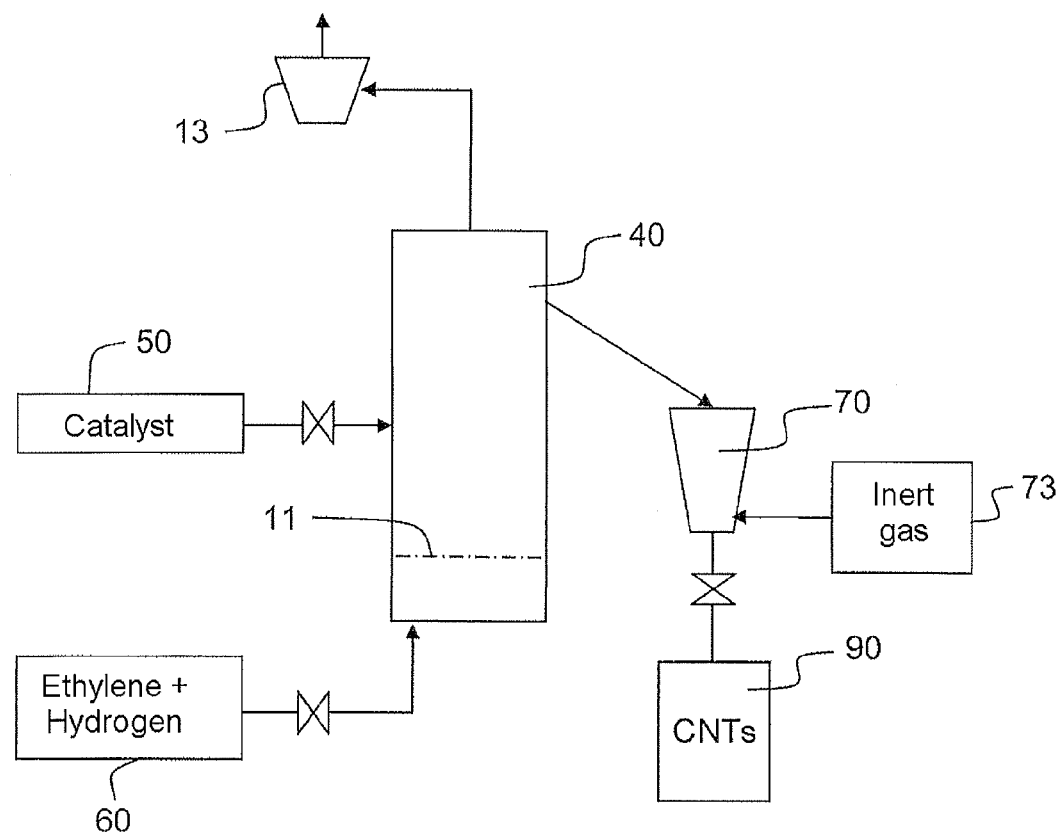
FIG. 2 shows the diagram of an apparatus for fabricating CNTs by means of a synthesis reactor and a container for recovering the CNTs according to a second technique of the prior art.
Figure 3:
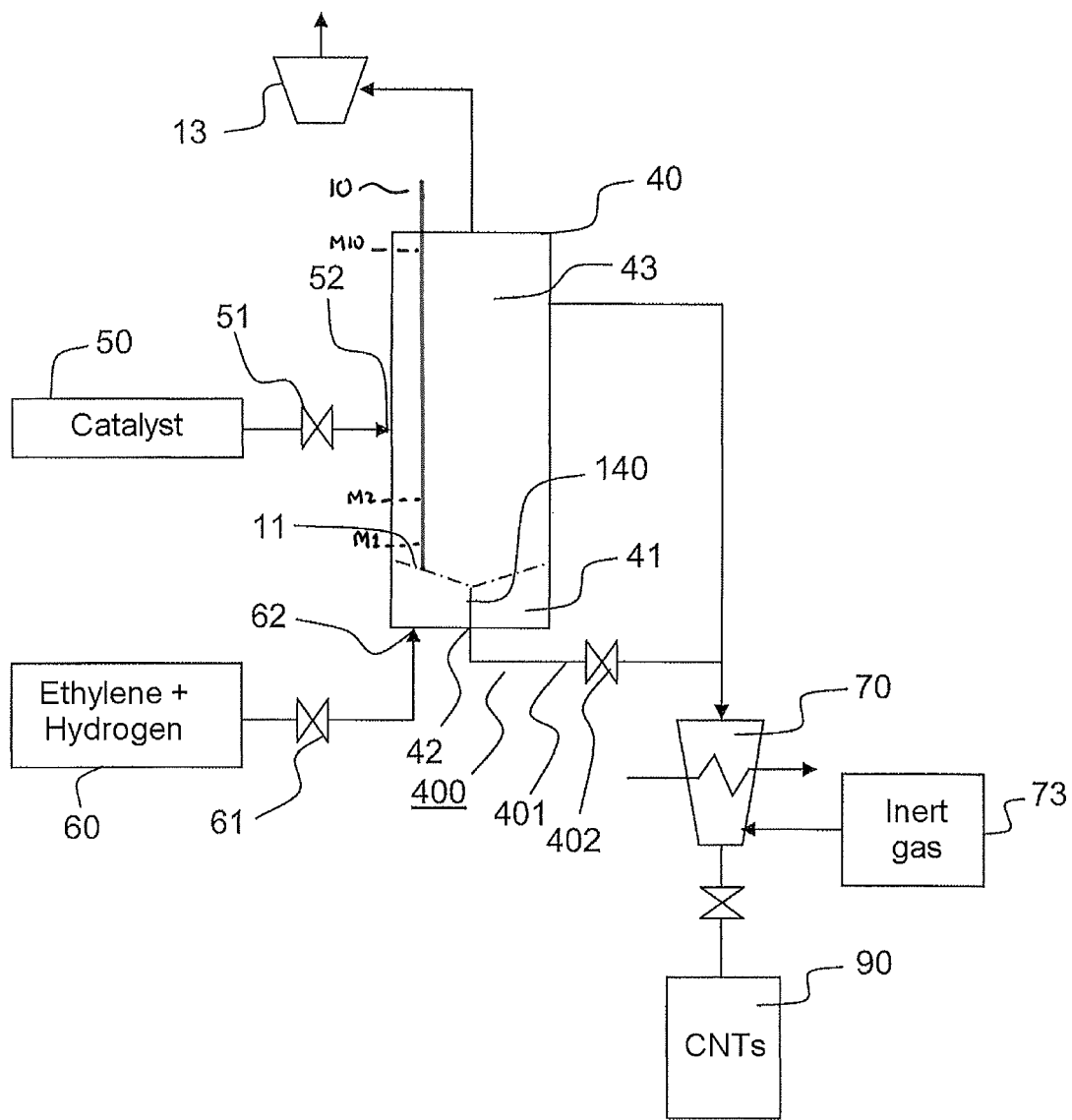
FIG. 3 shows the diagram of a first installation comprising an apparatus for fabricating CNTs and for recovering the CNTs produced according to the present invention.
Figure 4:
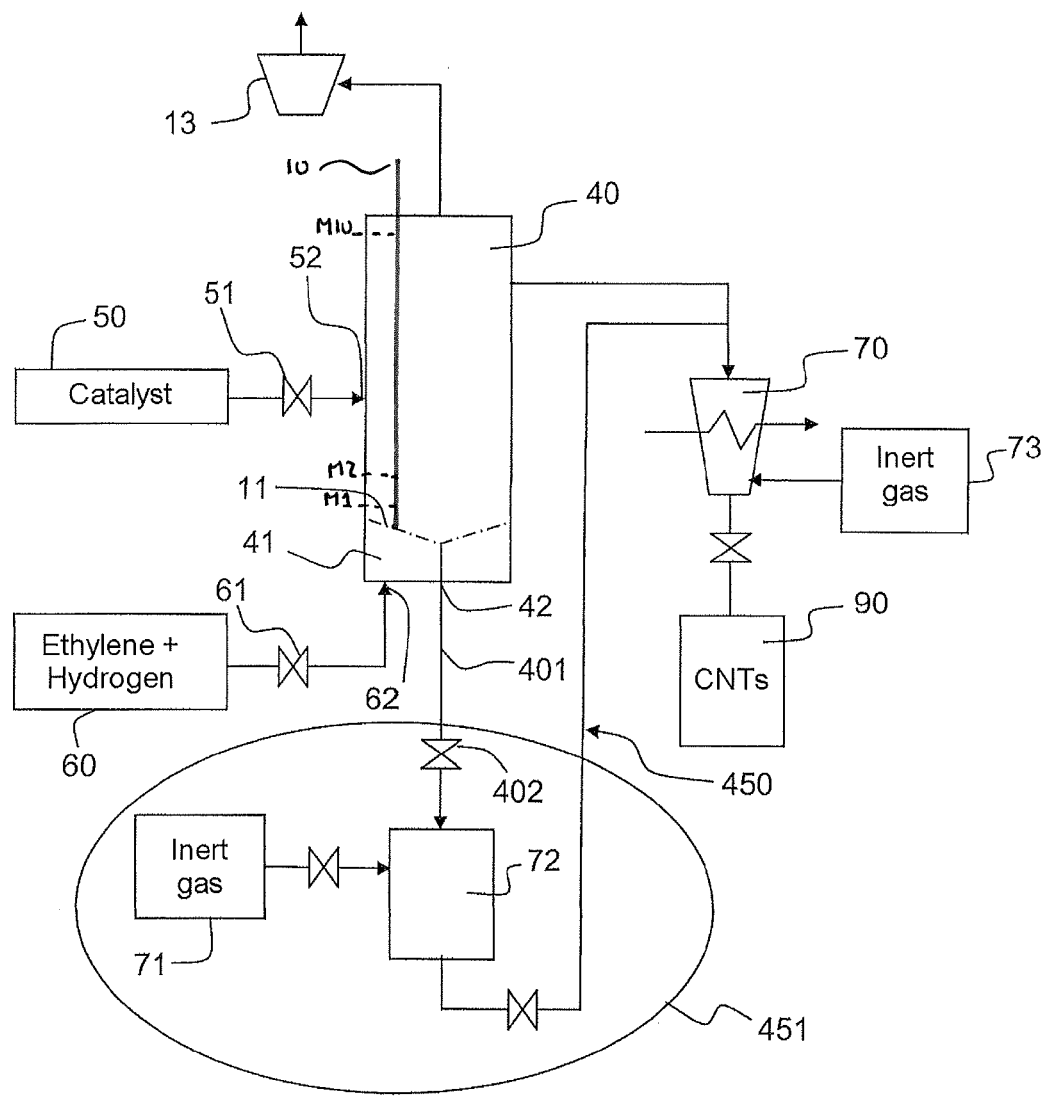
FIG. 4 shows the diagram of a second installation comprising an apparatus for fabricating CNTs and for recovering the CNTs produced according to the present invention.
Figure 5:
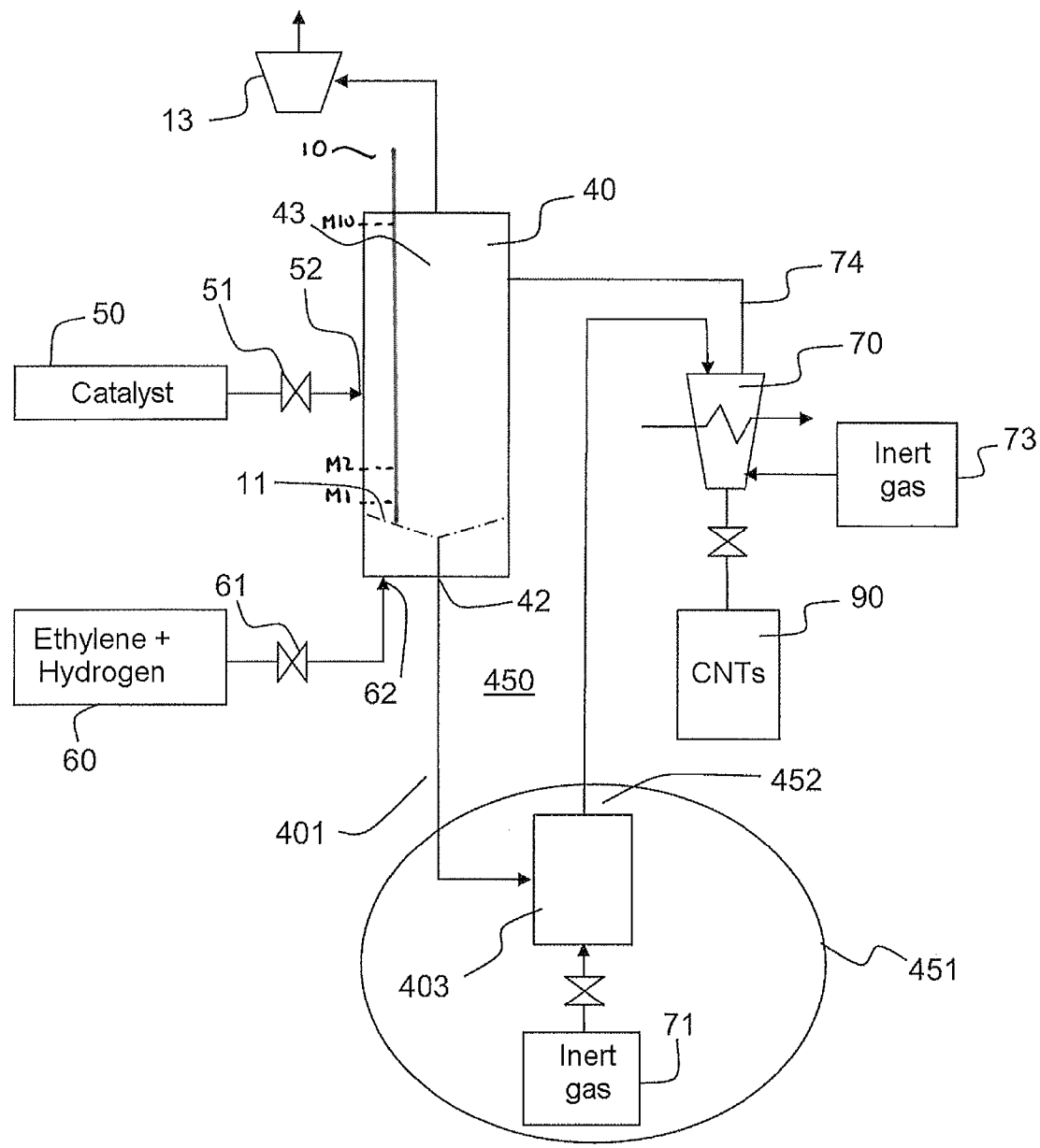
FIG. 5 shows the diagram of a third installation comprising an apparatus for fabricating CNTs and for recovering the CNTs produced according to the present invention.

The CNT synthesis reactors illustrated in FIGS. 3, 4 and 5 are hereinafter denoted "reactors".

The installations shown in FIGS. 3, 4 and 5 illustrate apparatuses comprising reactors 40 for synthesizing carbon nanotubes, means for recovering the carbon nanotubes synthesized in the reactors 40, cooling and storage means and, in the case of FIGS. 4 and 5, means for transporting the CNTs for cooling and storing them.

As described above, in practice agglomerates are recovered, the CNTs being fixed to the grains of catalytic substrate in the form of an entangled three-dimensional network, forming said agglomerates. In the rest of the description, these will also be referred to as CNT powder, it being understood that this comprises the agglomerates formed in the reactor 40.

The rest of the description will refer to these FIGS. 3, 4 and 5 which correspond, respectively, to apparatus for implementing the CNT synthesis and recovery process according to the invention. In all the examples, the reactors 40 are vertical. The CNTs are discharged in accordance with the invention at the foot 41 of the reactor 40, that is to say discharged from beneath the reactor. The reactors are equipped with means for detecting the filling of the vessel. These means are produced by a multipoint probe 10 taking the form of a tube penetrating into the vessel of the reactor from the top of the reactor and arriving above the reactive-gas diffusion distributor 11.

In a first exemplary embodiment illustrated by FIG. 3, the reactor 40 is located above the cooling container 70. In this configuration, a CNT discharge line 400 is provided between the draining outlet 42 of the reactor and the cooling container 70, which is at the foot of the reactor. This discharge line 400 comprises a pipe 401 fitted with the recovery valve 402. The valve 402 is a mechanical valve resistant to the heat of the output CNT powder.

In a second exemplary embodiment, the cooling container 70 is away from the reactor 40, for example in another building or on another storey, or is for example at an upper level.

The resulting installation is illustrated in FIG. 4. This installation enables an apparatus for implementing the process according to the invention to be easily integrated, whatever the configuration of the industrial building. In this case, a discharge line 450 comprises a pneumatic dense-phase transporting circuit 451, preferably so as to maintain the quality of the CNT powder and not to generate fine particles. The recovery valve 402 is placed beneath the reactor 40 on the start of the descending pipe 401, this being a portion of the pneumatic transporting circuit for the CNT powder. A first container 72, referred to as the delivery container, is placed in the transporting circuit 450. The gas 71 used for the transporting is an inert gas injected into the delivery pot 72. The transporting circuit 451 is used to convey the CNT powder leaving this container 72 to the cooling container 70.

In a third exemplary embodiment, the cooling container 70 is away from the reactor 40 and is, for example, in another building or another storey or is at an upper level.

The resulting installation is illustrated in FIG. 5. This installation enables an apparatus for implementing the process according to the invention to be easily integrated, whatever the configuration of the industrial building. In this case, the discharge line 450 comprises a pneumatic transporting circuit 451 requiring no mechanical valve. The powder present in the descending discharge line 401 serves as a plug during the reaction. During the draining operation, the powder is pneumatically transported by an inert gas 71. The inert gas is injected into the line by means of an injector 403 forming part of the L-valve or J-valve. The transporting circuit 450 is used to bring the CNT powder leaving the ejector 403 to the cooling container 70 equipped with an equilibrating line 73 for removing the transporting gas.

The use of a non-mechanical valve for recovering the CNT powder has the advantage of simplifying maintenance since, not being mechanical, there is no moving part and the valves do not seize up.

The process according to the invention is described below with the installation of FIG. 3 using an example in which the reactive gases chosen are ethylene and hydrogen. Of course, ethylene may be advantageously replaced with ethanol or with methanol. The inert gas used is nitrogen.

The catalyst employed is in the form of grains with a median diameter $d_{50}$ of around 50 to 400 µm, consisting of gamma-alumina covered with a layer of iron oxide.

The process for synthesizing CNTs and for their sequential recovery (corresponding to the frequency of filling of the reactor) at the reaction temperature (hot reactor) will be explained in detail below.

A defined mass MC of catalyst and carbon nanotubes is maintained in the reactor forming a bed. This mass represents 20 to 40% of the volume of the reactor. This catalytic bed is placed on the fluidizing grid or distributor 11 placed in the bottom of the vessel 41 of the reactor 40.

The valve 402, placed at the foot of the reactor on the CNT recovery outlet and also called the draining valve, is closed for the time $T_1$ for filling the reactor. This time $T_1$ corresponds to a CNT synthesis phase.

The temperature of the reactor is raised to the desired value of the synthesis, between 500° C. and 1500° C., in particular 700° C., and is maintained thereat.

The pulverulent catalyst, coming from the tank 50, is pulsingly introduced into the reactor vessel by means of the inlet 52 placed in the lateral portion of the vessel 43. The tank 50 is connected to the inlet 52 via a valve 51.

The reactive gases, namely the carbon source and the hydrogen, are continuously injected via the inlet 62 placed in the bottom of the vessel and located beneath the fluidizing grid 11 so as to produce a fluidized bed in the reactor vessel. The supply of gases 60 is connected to the inlet 62 via a valve 61.

Carbon nanotube growth then commences and lasts for a defined time $T_1$ resulting in the production of CNTs and hydrogen by catalytic decomposition of the carbon source.

When the reactor 40 is full, the supply of catalyst is stopped by closing the valve 51.

The supply of reactive gases remains open.

The recovery valve 402 placed on the draining outlet 42 at the foot of the reactor is opened so as to allow the carbon nanotubes obtained by synthesis in the reactor to be recovered.

In another variant, it is possible for maintaining the inflow of reactive gases only for a defined time $t_r$, corresponding to the drop in conversion to CNTs of the incoming gas, and then closed by closing the valve 61.

Figure 6:
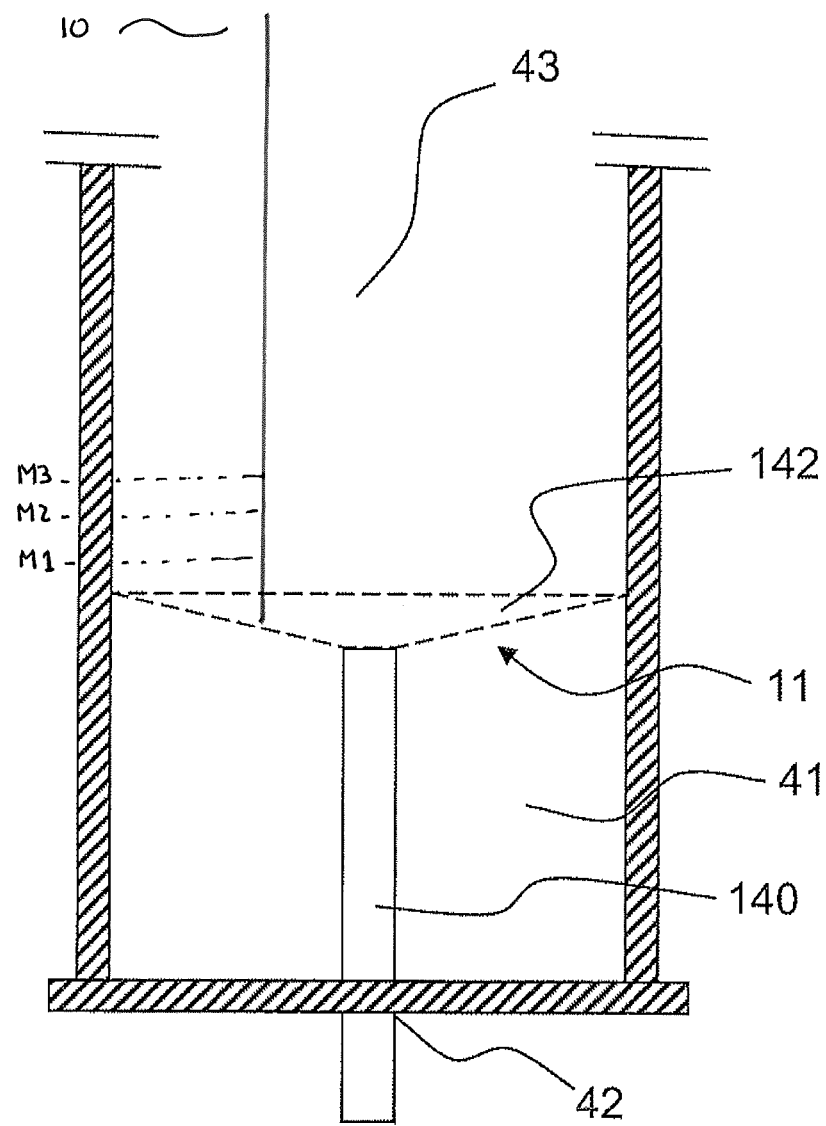
FIG. 6 shows in greater detail a preferred embodiment of the distributor according to the invention.

To facilitate the recovery of the CNTs, the fluidizing grid 11 placed in the bottom of the vessel has a suitable shape, illustrated by the diagram in FIG. 6. This grid is in the form of a funnel 142, the tube 140 of which is connected to the draining outlet 42 of the reactor. The outlet serves to recover the agglomerates that drop by gravity on the grid 11.

The valve 402 at the foot of the reactor is opened for a defined time $T_2$ so as to allow 60 to 80% of the filling volume of the reactor to be recovered and to maintain a bed representing 20 to 40% of this volume. The time $T_2$ corresponds to a CNT recovery phase that takes place at the synthesis temperature, i.e. 700° C. in the example.

This draining operation will be carried out one or more times, depending on the capacity of the inerting container 70 that receives the powder.

The valve 402 is chosen from heat-resistant valves so as to allow the carbon nanotubes to be recovered at the reaction temperature. The valve is also preferably chosen from valves able to have automatically controlled opening and closing in response to a predetermined sequence. The valve will be chosen for example from the electronically controlled valves. A container 70 for cooling and inerting the carbon nanotubes is connected to the recovery valve 402. The carbon nanotubes are inerted by nitrogen 71 in the cooling container.

Thus, the CNTs are discharged sequentially at the bottom of the reactor by means of the valve 402. Preferably, the valve-opening frequency is set at start-up. The CNT filling time $T_1$ and recovery time $T_2$ are predetermined and may be measured during a first phase of initializing the synthesis process.

A stream of inert gas, such as nitrogen or argon, may be continuously or sequentially provided so as to cool and fluidize the output of powder formed from agglomerates. The inert gas may be injected into the pipe connecting the recovery valve 402 to the draining outlet of the reactor for example.

Thus, the heating of the reactor is not stopped—it is unnecessary to wait until it has cooled down in order to recover the CNTs. In addition, the draining of the reactor and the recovery of the CNT powder takes place in one and the same operation.

The carbon nanotube fabrication process according to the invention thus results in a markedly higher productivity than that of the processes of the prior art.

Furthermore, the pressure in the reactor is low, since the process is carried out under pressure conditions corresponding to atmospheric pressure. In practice, the pressure corresponds to atmospheric pressure to which is added the pressure drops of the lines, i.e. a pressure of less than 1.1 bar absolute or a regulated pressure of less than 1.5 bar absolute.

The low-pressure working conditions make it possible to use less restrictive and consequently less expensive equipment, as there is no need to use pressure-resistant equipment, which is generally more expensive.

The invention claimed is:

1. An industrial process for fabricating carbon nanotubes (CNTs), comprising synthesis of the carbon nanotubes by decomposing a carbon source brought into contact, in a fluidized-bed reactor at a reaction temperature between 500° C. and 1500° C. with a catalyst in the form of substrate grains covered with a metal, the nanotubes produced being recovered, in which the carbon nanotubes synthesized in the reactor and fixed onto the grains of catalytic substrate in the form of an entangled three-dimensional network, forming agglomerates constituting the CNT powder, are recovered sequentially by discharging them while hot at the reaction temperature for synthesizing the CNTs, and discharge taking place beneath the reactor via an outlet of the reactor;
   wherein it comprises the following steps:
   1) the temperature of the reactor is raised to the value desired for the synthesis, between 500° C. and 1500° C. for an initialization phase and this temperature is maintained with a carbon nanotube powder feedstock in the reactor;
   2) a CNT synthesis phase for a defined time $T_1$, consisting in:
      pulsingly injecting the catalyst into the reactor by means of an inert gas and
      continuously injecting reactive gases containing the carbon source into the reactor; and
   3) a hot CNT recovery phase for a time $T_2$, consisting in:
      stopping the injection of the catalyst when the reactor reaches a predetermined filling level,
      continuing to inject the reactive gases containing the carbon source, or stopping the injection after having maintained it for a defined time $t_r$,
      discharging the CNT powder beneath the reactor in order to introduce it into a cooling container,
      stopping the discharge and
      recommencing a new phase 2).

2. An industrial process for fabricating carbon nanotubes (CNTs), comprising synthesis of the carbon nanotubes by decomposing a carbon source brought into contact, in a fluidized-bed reactor at a reaction temperature between 500° C. and 1500° C. with a catalyst in the form of substrate grains covered with a metal, the nanotubes produced being recovered, in which the carbon nanotubes synthesized in the reactor and fixed onto the grains of catalytic substrate in the form of an entangled three-dimensional network, forming agglomerates constituting the CNT powder, are recovered sequentially by discharging them while hot at the reaction temperature for synthesizing the CNTs, and discharge taking place via the bottom of the reactor by means of a bottom outlet of the reactor;

wherein it comprises the following steps:
1) the temperature of the reactor is raised to the value desired for the synthesis, between 500° C. and 1500° C. for an initialization phase and this temperature is maintained with a carbon nanotube powder feedstock in the reactor;
2) a CNT synthesis phase for a defined time $T_1$, consisting in:
pulsingly injecting the catalyst into the reactor by means of an inert gas and
continuously injecting reactive gases containing the carbon source into the reactor; and
3) a hot CNT recovery phase for a time $T_2$, consisting in:
stopping the injection of the catalyst when the reactor is full,
continuing to inject the reactive gases containing the carbon source, or stopping the injection after having maintained it for a defined time $t_r$,
discharging the CNT powder at the bottom of the reactor in order to introduce it into a cooling container,
stopping the discharge and
recommencing a new phase 2).

3. The industrial process for fabricating carbon nanotubes (CNTs) according to claim 2, wherein the CNTs are discharged via the bottom outlet of the reactor, said outlet corresponding to an outlet for draining the reactor, said outlet being provided with a valve-type shutoff system, opened sequentially, the outlet of this system being connected to a cooling/storage container capable of holding the CNT powder.

4. The industrial process for fabricating carbon nanotubes (CNTs) according to claim 2, wherein the pressure in the reactor is a pressure corresponding to atmospheric pressure.

5. The industrial process for fabricating carbon nanotubes (CNTs) according to claim 2, wherein the catalyst comprises at least one catalytic metal selected from the group consisting of iron, cobalt, nickel and molybdenum, supported by a chemically inert solid substrate in granular form selected from the group consisting of alumina, silica, magnesia, and carbon.

6. The industrial process for fabricating carbon nanotubes (CNTs) according to claim 2, wherein the carbon source is a gaseous source selected from the group consisting of methane, ethane, propane, butane, ethylene, acetylene and benzene, either separately or as a mixture.

7. An industrial process for fabricating carbon nanotubes (CNTs), comprising synthesis of the carbon nanotubes by decomposing a carbon source brought into contact, in a fluidized-bed reactor at a reaction temperature between 500° C. and 1500° C. with a catalyst in the form of substrate grains covered with a metal, the nanotubes produced being recovered, in which the carbon nanotubes synthesized in the reactor and fixed onto the grains of catalytic substrate in the form of an entangled three-dimensional network, forming agglomerates constituting the CNT powder, are recovered sequentially by discharging them while hot at the reaction temperature for synthesizing the CNTs, and discharge taking place via the bottom of the reactor by means of a bottom outlet of the reactor; wherein the CNTs are discharged via the bottom outlet of the reactor, said outlet corresponding to an outlet for draining the reactor, said outlet being provided with a valve-type shutoff system, opened sequentially, the outlet of this system being connected to a cooling/storage container capable of holding the CNT powder;

wherein it comprises the following steps:
1) the temperature of the reactor is raised to the value desired for the synthesis, between 500° C. and 1500° C. for an initialization phase and this temperature is maintained with a carbon nanotube powder feedstock in the reactor;
2) a CNT synthesis phase for a defined time $T_1$, consisting in:
pulsingly injecting the catalyst into the reactor by means of an inert gas and
continuously injecting reactive gases containing the carbon source into the reactor; and
3) a hot CNT recovery phase for a time $T_2$, consisting in:
stopping the injection of the catalyst when the reactor is full,
continuing to inject the reactive gases containing the carbon source, or stopping the injection after having maintained it for a defined time $t_r$,
discharging the CNT powder at the bottom of the reactor in order to introduce it into a cooling container,
stopping the discharge and
recommencing a new phase 2).

8. The industrial process for fabricating carbon nanotubes according to claim 2, wherein the temperature of the reactor is raised to between 600° C. and 900° C.

9. The industrial process for fabricating carbon nanotubes according to claim 2, wherein the temperature of the reactor is raised to 700° C.

10. The industrial process for fabricating carbon nanotubes according to claim 7, wherein the temperature of the reactor is raised to between 600° C. and 900° C.

11. The industrial process for fabricating carbon nanotubes according to claim 7, wherein the temperature of the reactor is raised to 700° C.

12. The industrial process for fabricating carbon nanotubes according to claim 2, wherein the carbon source is ethylene.

13. The industrial process for fabricating carbon nanotubes according to claim 2, wherein the carbon source is ethylene obtained by dehydration of ethanol resulting from the fermentation of plant matter.

14. The industrial process for fabricating carbon nanotubes (CNTs) according to claim 7, wherein the pressure in the reactor is a pressure corresponding to atmospheric pressure.

15. The industrial process for fabricating carbon nanotubes (CNTs) according to claim 7, wherein the catalyst comprises at least one catalytic metal selected from the group consisting of iron, cobalt, nickel and molybdenum, supported by a chemically inert solid substrate in granular form selected from the group consisting of alumina, silica, magnesia, and carbon.

16. The industrial process for fabricating carbon nanotubes (CNTs) according to claim 7, wherein the carbon source is a gaseous source selected from the group consisting of methane, ethane, propane, butane, ethylene, acetylene and benzene, either separately or as a mixture.

17. The industrial process for fabricating carbon nanotubes (CNTs) according to claim 7, wherein the carbon source is ethylene.

18. The industrial process for fabricating carbon nanotubes (CNTs) according to claim 7, wherein the carbon source is ethylene obtained by dehydration of ethanol resulting from the fermentation of plant matter.

* * * * *